(12) United States Patent
Even

(10) Patent No.: US 12,256,479 B2
(45) Date of Patent: Mar. 18, 2025

(54) CARBONOUS MATERIALS FOR RADIO FREQUENCY HEATING IN REACTION SYSTEMS

(71) Applicant: Honeywell Federal Manufacturing & Technologies, LLC, Kansas City, MO (US)

(72) Inventor: Dakota Even, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

(21) Appl. No.: 18/656,289

(22) Filed: May 6, 2024

(65) Prior Publication Data

US 2024/0381498 A1 Nov. 14, 2024

Related U.S. Application Data

(60) Provisional application No. 63/500,691, filed on May 8, 2023.

(51) Int. Cl.
*H05B 6/54* (2006.01)
*B29C 39/00* (2006.01)
(Continued)

(52) U.S. Cl.
CPC ............ *H05B 6/54* (2013.01); *B29C 39/003* (2013.01); *B29C 39/02* (2013.01); *B29C 39/36* (2013.01);
(Continued)

(58) Field of Classification Search
CPC .......... H05B 6/54; H05B 6/60; B29C 39/003; B29C 39/02; B29C 39/36; B29C 39/38;
(Continued)

(56) References Cited

U.S. PATENT DOCUMENTS 6,136,386 A * 10/2000 Nakahigashi ......... C23C 16/507
427/904
2020/0317957 A1 10/2020 Sweeney et al.

FOREIGN PATENT DOCUMENTS

WO 2021055396 A1 3/2021

OTHER PUBLICATIONS

Aniruddh Vashisth, et al., Radio frequency heating and material processing using carbon susceptors, Nanoscale Adv., 2021, 3, 5255-5264, Published by the Royal Society of Chemistry.
(Continued)

*Primary Examiner* — Quang T Van
(74) *Attorney, Agent, or Firm* — Erise IP, P.A.

(57) ABSTRACT

A system may include a container receiving at least one substance. A system may include a heating assembly heating the at least one substance. A system may include a plurality of electrodes; a power source connected to the plurality of electrodes, wherein an electrical field between the plurality of electrodes is created by providing power to the plurality of electrodes; and one or more heat-dispersing bodies dispersed in the at least one substance, the one or more heat-dispersing bodies including: a polymer material and a carbonous material dispersed in the polymer material, the carbonous material generating heat within the container responsive to the electrical field between the plurality of electrodes.

20 Claims, 6 Drawing Sheets

(51) Int. Cl.
  *B29C 39/02* (2006.01)
  *B29C 39/36* (2006.01)
  *B29C 39/38* (2006.01)
  *H05B 6/60* (2006.01)
  *B29K 33/00* (2006.01)
  *B29K 105/00* (2006.01)
  *B29K 105/16* (2006.01)
  *B29K 427/18* (2006.01)
  *B29K 507/04* (2006.01)
  *B29L 31/18* (2006.01)

(52) U.S. Cl.
  CPC ............... *B29C 39/38* (2013.01); *H05B 6/60* (2013.01); *B29C 2791/002* (2013.01); *B29K 2033/08* (2013.01); *B29K 2105/0061* (2013.01); *B29K 2105/0064* (2013.01); *B29K 2105/162* (2013.01); *B29K 2427/18* (2013.01); *B29K 2507/04* (2013.01); *B29K 2995/0013* (2013.01); *B29L 2031/18* (2013.01)

(58) Field of Classification Search
  CPC ........ B29C 2791/002; B29K 2033/008; B29K 2105/0061; B29K 2105/0064; B29K 2995/0013; B29L 2031/18
  USPC ................ 219/764, 770, 773, 774, 778, 780
  See application file for complete search history.

(56) References Cited

OTHER PUBLICATIONS

Charles B. Sweeney, et al., Radio Frequency Hearting of Cardon Nanotube Composite Materials, ACS Appl Master Interfaces, Aug. 15, 2018, Pubmed.gov.

Duy T. Nguyen, M.D., et al., Carbon Nanotube Facilitation of Myocardial Ablation with Radiofrequency Energy, Medtronic, Journal of Cardiovascular Electrophysiology vol. 25, No. 12, Dec. 2014.

Nutan Patil, et al., Radio Frequency Driven Heating of Catalytic Reactors for Portable Green Chemistry, Adanced. Sustainable Systems 2020, 4, 2000095, 2020, 6 pages(s), www.advsustainsys.com.

* cited by examiner

CARBONOUS MATERIALS FOR RADIO FREQUENCY HEATING IN REACTION SYSTEMS

CROSS-REFERENCE TO RELATED APPLICATIONS

This application claims priority benefit, with regard to all common subject matter, of U.S. Provisional Patent Application No. 63/500,691, filed May 8, 2023, and entitled "CARBONOUS MATERIALS FOR RADIO FREQUENCY HEATING IN REACTION SYSTEMS." The above-referenced application is hereby incorporated by reference in its entirety into the present application.

STATEMENT OF GOVERNMENT SUPPORT

This invention was made with government support under contract number DE-NA0002839 awarded by the United States Department of Energy/National Nuclear Security Administration. The government has certain rights in the invention.

BACKGROUND

1. Field

Embodiments of the invention generally relate to heating mechanisms and, more particularly, to radio frequency heating systems for chemical reactors.

2. Related Art

A crucial aspect of many reactor systems is a means to heat the various substances in the system. For example, adding heat to a chemical reaction may be necessary to achieve the desired result of that reaction. Therefore, many industries that utilize reactor systems look for ways to heat essential substances. One solution for heating substances in a container is to use external, outside-in heating. For example, a heater may be attached to the outside of a container holding the substances to be heated. As the heater warms the outside of the container, the outside of the container transfers heat to the substances. This means of heating substances has many disadvantages. For example, heating substances using an "outside-in" approach may result in inconsistent heating because substances closer to the outside of the container receive more heat than substances in the center of the container.

Another solution for heating substances in a container is to use an internal, inside-out heating system. In internal heating systems, the heating elements are inside the container where the substances are held. Internal heating systems have advantages over external heating systems. For example, internal heating systems may provide more consistent heating among the various substances.

Currently, reactor systems, including packed bed reactor systems, utilize external, outside-in heating systems to heat the substances within. As a result, heating may be inefficient, inconsistent, and difficult to monitor and control. Therefore, a need exists for inside-out heating systems for reactor systems and methods of manufacturing heating system components.

SUMMARY

In some aspects, the techniques described herein relate to a system for radio frequency heating including: a container configured to receive at least one substance; a heating assembly configured to heat the at least one substance, the heating assembly including: a plurality of electrodes; a power source connected to the plurality of electrodes, wherein an electrical field between the plurality of electrodes is created by providing power to the plurality of electrodes; and one or more heat-dispersing bodies dispersed in the at least one substance, the one or more heat-dispersing bodies including: a polymer material; and a carbonous material dispersed in the polymer material, the carbonous material configured to generate heat within the container responsive to the electrical field between the plurality of electrodes.

In some aspects, the techniques described herein relate to a system, wherein the one or more heat-dispersing bodies are distributed throughout the at least one substance, such that a first concentration of the one or more heat-dispersing bodies in a first portion of the at least one substance is approximately equal to a second concentration of the one or more heat-dispersing bodies in any other non-overlapping portion of the at least one substance.

In some aspects, the techniques described herein relate to a system, wherein the one or more heat-dispersing bodies are dispersed in the at least one substance such that for any pre-established volume in the container, every heat-dispersing body is approximately equal in distance from adjacent heat-dispersing bodies.

In some aspects, the techniques described herein relate to a system further including: an intake valve, wherein the intake valve is configured to receive the at least one substance; and an outtake valve configured to remove the at least one substance from the system.

In some aspects, the techniques described herein relate to a system further including: a catalyst material mixed throughout the at least one substance, the catalyst material configured to stimulate a reaction between the at least one substance.

In some aspects, the techniques described herein relate to a system, wherein the carbonous material includes a plurality of carbon nanotubes.

In some aspects, the techniques described herein relate to a system, wherein the polymer material includes Polytetrafluoroethylene.

In some aspects, the techniques described herein relate to a system, wherein the one or more heat-dispersing bodies are circulated throughout the container.

In some aspects, the techniques described herein relate to a method of manufacturing carbonous material filled polymer, the method including: creating a polytetrafluoroethylene nanoparticle suspension; combining the polytetrafluoroethylene nanoparticle suspension with water, a plurality of carbonous materials, a water-soluble polymer, and a catalyst to form a mixture; heating the mixture to form a hydrogel, wherein the hydrogel is pourable; pouring the hydrogel into a mold; heating the hydrogel to form a solid body, wherein the solid body is shaped as the mold is shaped; removing the solid body from the mold; and thermally treating the solid body such that the water and the water-soluble polymer are removed from the solid body.

In some aspects, the techniques described herein relate to a method, wherein the water-soluble polymer is an acrylate polymer.

In some aspects, the techniques described herein relate to a method, wherein the acrylate polymer is Polyethylene glycol diacrylate.

In some aspects, the techniques described herein relate to a method, wherein a weight percentage of polytetrafluoroethylene in the polytetrafluoroethylene nanoparticle suspension is 30%.

In some aspects, the techniques described herein relate to a method, wherein a weight percentage of the plurality of carbonous materials in the mixture is 4%.

In some aspects, the techniques described herein relate to a method, wherein, responsive to thermally treating the solid body, the carbonous material filled polymer is reactive to RF heating.

In some aspects, the techniques described herein relate to a method of radio frequency heating at least one substance, the method including: dispersing the at least one substance in a container, wherein the at least one substance is disposed between a plurality of electrodes; dispersing a plurality of heat-dispersing bodies in the at least one substance between the plurality of electrodes, wherein the plurality of heat-dispersing bodies are configured to heat up when exposed to an alternating electric field between the plurality of electrodes, wherein the plurality of heat-dispersing bodies are configured to disperse heat to the at least one substance; and generating the alternating electric field between the plurality of electrodes by electrically connecting the plurality of electrodes to a power source.

In some aspects, the techniques described herein relate to a method, wherein the plurality of heat-dispersing bodies in the at least one substance are dispersed such that that plurality of heat-dispersing bodies are dispersed evenly throughout the at least one substance.

In some aspects, the techniques described herein relate to a method, wherein dispersing the plurality of heat-dispersing bodies in the at least one substance is completed such that that plurality of heat-dispersing bodies is concentrated in a portion of the at least one substance.

In some aspects, the techniques described herein relate to a method, further including: mixing the at least one substance using the plurality of heat-dispersing bodies, wherein the plurality of heat-dispersing bodies is a static mixer.

In some aspects, the techniques described herein relate to a method, wherein a heat-dispersing body from the plurality of heat-dispersing bodies includes: a polymer material; and a carbonous material dispersed in the polymer material, the carbonous material configured to generate heat within the container responsive to the alternating electric field between the plurality of electrodes.

In some aspects, the techniques described herein relate to a method, further including: pumping the at least one substance and the plurality of heat-dispersing bodies into the container; and pumping the at least one substance and the plurality of heat-dispersing bodies out of the container.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWINGS

Embodiments of the invention are described in detail below with reference to the attached drawing figures, wherein.

Figure 1A:
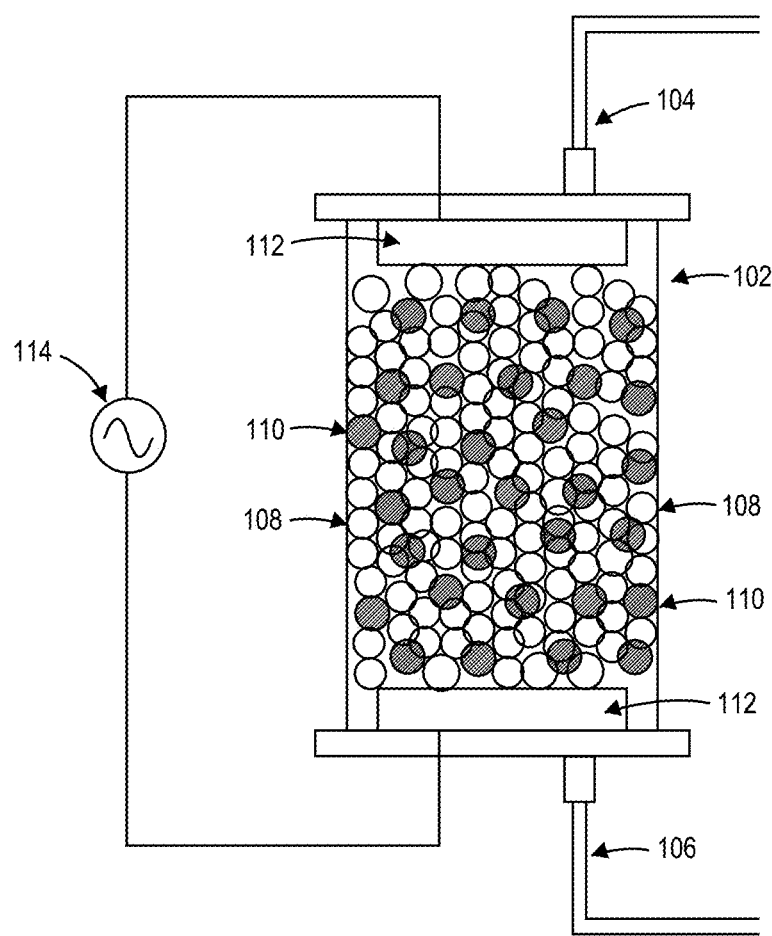
FIG. 1A depicts a first example of a radio frequency (RF) heating system in accordance with embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention relate to radio frequency (RF) heating systems and methods of use therein. With RF heating systems, a rapidly varying electric field is generated to thereby produce heat within a targeted material. In embodiments, the RF heating system may include a container with a plurality of electrodes attached or otherwise mounted to the container. The RF heating system includes a plurality of heat-dispersing bodies dispersed within the substance. An electric field is generated between the plurality of electrodes to thereby produce heat. The method of using an RF heating system may include placing a plurality of heat-dispersing bodies mixed with at least on, where the electric field is created by electrically connecting a plurality of electrodes to a power source. Embodiments of this invention also relate to heat-dispersing bodies and methods of manufacturing said components. The heating component may include Polytetrafluoroethylene as a base layer and carbonous material dispersed throughout. The method of manufacturing the heat-dispersing bodies may include creating a hydrogel and treating it to become a solid part.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document in conjunction with other present or future technologies. Minor variations from the description below will be obvious to one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. Therefore, the following detailed description is not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Figure 1B:
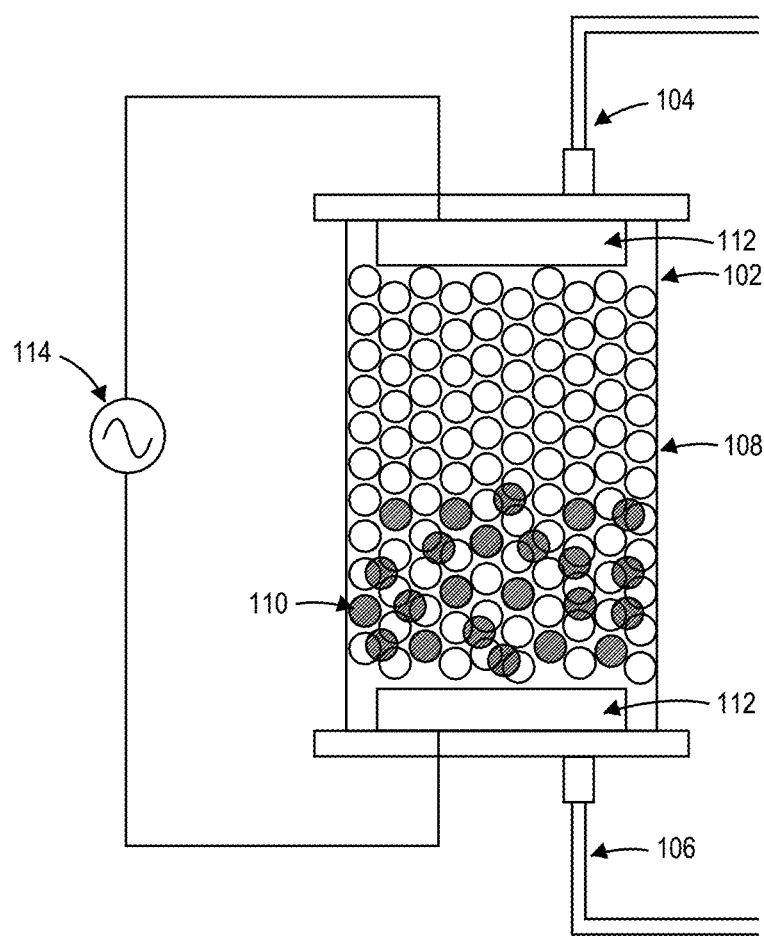
FIG. 1B depicts a second example of an RF heating system in accordance with embodiments of the invention.
Figure 1C:
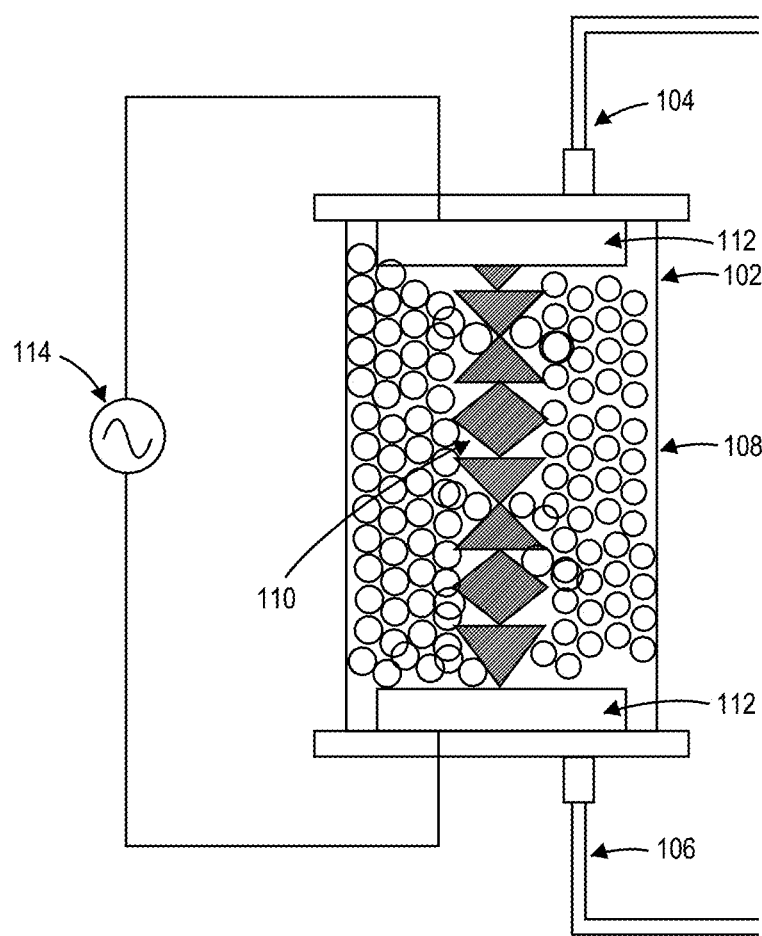
FIG. 1C depicts a third example of an RF heating system in accordance with embodiments of the invention.

Turning to FIGS. 1A-1C, the RF heating system 100 may comprise a container 102 for receiving at least one substance 108 to be heated and a heating assembly mounted within the container for generating heat and dispersing the generated heat to the at least one substance in the container. In embodiments, the heating assembly may comprise at least one heat-dispersing body 110 dispersed at desired locations in the at least one substance 108, at least two electrodes 112, and a power source 114 for generating an electric field between the at least two electrodes 112 to thereby produce heat. The generated heat may be supplied to the at least one heat-dispersing body 110, such that each heat-dispersing body 110 receives the heat and disperses the heat based on pre-set performance requirements.

In embodiments, at least one heat-dispersing body 110 is dispersed at a pre-set location in the container 102 to achieve a desired result. For example, as described in FIG. 1A, a plurality of heat-dispersing bodies may be mixed with at least one substance in container 102 such that the concentration of heat-dispersing bodies in a first portion of the substance is approximately equal to the concentration of heat-dispersing bodies in any other non-overlapping portion of the substance (e.g., the plurality of heat-dispersing bodies is uniformly distributed throughout the at least one substance in container 102). Additionally or alternatively, a plurality of heat-dispersing bodies may be mixed with at least one substance in container 102 such that, for any pre-established volume in the container, every heat-dispersing body is approximately equal in distance from adjacent heat-dispersing bodies. As yet an additional or alternative embodiment, a plurality of heat-dispersing bodies may be mixed with at least one substance in container 102 such that for any pre-set volume of the container, a number of heat-dispersing bodies within the pre-set volume is within at least 20 percent, at least 10 percent, at least 5 percent, or at least 3 percent of a number of heat-dispersing bodies within any other similarly-sized pre-set volume of the container. As such, any variation of the number of heat-dispersing bodies within two substantially similarly sized volumes of the container is less than 20 percent, less than 10 percent, less than 5 percent, or less than 3 percent difference or variation. In yet another additional or alternative embodiment, a plurality of heat-dispersing bodies may be randomly packed (e.g., randomly distributed) throughout the container. In embodiments and as discussed below, the heat-dispersing bodies are circulated throughout the container. Therefore, for the embodiments described in this and the following paragraphs discussing the concentration of the heat-dispersing bodies in the at least one substance, such concentration may be for any pre-established operating time, such as at least 1 second-ten minutes.

In an even additional or alternative embodiment, and as described in FIG. 1B, a plurality of heat-dispersing bodies may be concentrated in a first portion or segment of container 102 (e.g., present in a greater proportion relative to all other portions of the container), such that only the substance in the first portion of the container is heated. In still other embodiments, the container may have a greater concentration of heat-dispersing bodies in some locations than other locations of the container, resulting in certain portions of the substance in the container being heated to greater temperatures than other portions of the substance.

RF heating systems such as RF heating system 100a, RF heating system 100b, and RF heating system 100c may be used for any suitable application known or later developed, including chemical reactor systems, microfluidics, batch chemistry, and similar processes. In some embodiments, such RF heating systems are used in continuous flow chemistry. For example, RF heating systems may be used to heat substances from the inside out in continuous flow systems. In other embodiments, such RF heating systems are used in microreactor systems.

Broadly RF heating systems, such as those contemplated in FIGS. 1A-1C, may be beneficial over alternative forms of heating for any number of applications, such as for low flow rates, diffusion-limited mixing, systems utilizing catalysts, and the like. For example, RF heating systems may be beneficial when regions in the system need to alternate between heating periods and cooling periods.

RF heating system 100a may uniformly heat at least one substance 108 in a container 102 using a heating assembly. The heating assembly may comprise at least two electrodes 112, at least one heat-dispersing body 110, and a power source 113 for generating RF waves to produce heat for heating at least one substance 108. When at least one heat-dispersing body 110 is mixed with at least one substance 108 and exposed to an RF field, the at least one heat-dispersing body 110 may generate heat for heating the at least one substance 108.

In some embodiments, RF heating system 100a includes a container 102. Broadly, container 102 may be selected to serve a particular purpose, such as serving as a reactor in a continuous flow chemistry system. In some embodiments, container 102 is any suitable container known or later developed, including a tube, pipe, tank, reactor, and similar containers. For example, container 102 may be a packed column. In some embodiments, container 102 is formed from any suitable material, including plastic, metal, glass, and similar materials.

In some embodiments, a plurality of electrodes may be attached to container 102 in any suitable configuration allowing for the creation of an electric field. In other embodiments, an electrode 112 is attached to the top of the inside of container 102, and an electrode 112 is attached to the bottom of the inside of container 102. In some embodiments, at least two electrodes 112 are attached to the inside of container 102 by any suitable means. For example, at least two electrodes 112 may be attached to the top and/or the bottom of the inside of container 102 using one or more fasteners. For another example, at least two electrodes 112 may be built into the top and/or the bottom of the inside of container 102 during manufacturing of container 102. For another example, at least two electrodes 112 may be the top and/or the bottom of the inside of container 102. In yet another example, at least two electrodes 112 may be disposed externally to container 102 such as on an external side of container 102.

The at least two electrodes 112 may be electrical conductors. In some embodiments, at least two electrodes 112 are formed from a conductive metallic material, such as copper, silver, aluminum, gold, or any combination thereof. In other embodiments, at least two electrodes 112 are formed from a nonmetallic material, such as graphite.

The sizes of the at least two electrodes 112 may be chosen to allow for a desired strength of electric field to be generated between them when a power source supplies the at least two electrodes 112 with a waveform. Broadly, the distance between the at least two electrodes 112 may correlate to the strength of electric field between upper the at least two electrodes 112. For example, as the distance between the at least two electrodes 112 increases, the field strength between the at least two electrodes 112 decreases. Therefore, the distances between the at least two electrodes 112 may be selected to achieve a desired field strength, and, in turn, a desired temperature for heating the at least one substance 108 may be achieved.

In some embodiments, at least one substance 108 is dispersed throughout container 102. Broadly, at least one substance 108 may be any suitable substance for RF heating system 100a. In some embodiments, at least one substance 108 is one or more materials to be mixed/combined. In other embodiments, at least one substance 108 is a plurality of materials to be chemically reacted. In some embodiments, at least one substance 108 may include a catalyst. For example, the at least one substance 108 may include catalyst pellets. Broadly, the catalyst may serve the purpose of stimulating a reaction as well as increasing the rate at which a reaction occurs. Further, embodiments are contemplated in which the catalyst is used to convert a resin material into a solid form. In such embodiments, the material forming the catalyst may be any suitable material known or later developed, including palladium on carbon, acidic resin catalysts, iron oxides on alumina, and similar catalysts.

In some embodiments, the at least one substance 108 is pumped into and received by container 102 through intake valve 104 and pumped out of container 102 through outtake valve 106. For example, the at least one substance 108 may be pumped into container 102 before a chemical reaction involving the at least one substance 108 has occurred and pumped out of container 102 after the reaction has occurred. In some embodiments, at least one heat-dispersing body 110 and at least one substance 108 are pumped into container 102 through intake valve 104 and pumped out of container 102 through outtake valve 106. In such embodiments, the at least one heat-dispersing body 110 is circulating throughout heating system 100a.

In some embodiments, intake valve 104 and/or outtake valve 106 may include a pump. In such embodiments, the pump may push at least one substance 108 into container 102 or out of container 102. In some embodiments, at least one substance 108 is pumped out of the RF heating system 100a when the at least one substance 108 reaches a predetermined temperature. In other embodiments, at least one substance 108 is pumped out of the RF heating system 100a when a particular chemical reaction has occurred. In still other embodiments, at least one substance 108 is pumped out of the RF heating system 100a when at least one substance 108 has been sufficiently mixed.

In some embodiments, the rate at which at least one substance 108 is pumped in and out of container 102 is predetermined. In other embodiments, the rate at which the at least one substance 108 is pumped in and out of container 102 is based on the rate at which a chemical reaction involving the at least one substance 108 occurs. In still other embodiments, the rate at which the at least one substance 108 is pumped in and out of container 102 is correlated with the rate at which the at least one substance 108 is heated.

In some embodiments, the at least one heat-dispersing body 110 is evenly dispersed throughout the at least one substance 108 in order to provide uniform heating. In some embodiments, at least one heat-dispersing body 110 may be comprised of the heat-dispersing body 110 depicted below in FIG. 3. In other embodiments, at least one heat-dispersing body 110 may be made up of a variation of or entirely different component than that depicted in FIG. 3.

In some embodiments, as discussed below with respect to FIG. 3, the at least one heat-dispersing body 110 may be manufactured using method 400 (discussed below). In other embodiments, however, the at least one heat-dispersing body 110 may be manufactured using a variation or entirely different process than that discussed below with respect to method 400. For example, at least one heat-dispersing body 110 may be manufactured using powder molding.

Broadly, at least one heat-dispersing body 110 may be any suitable shape now known or later developed, including, but not limited to, arcuate, rectangular, and ellipsoidal. In some embodiments, as discussed above with respect to heat-dispersing body 110, at least one heat-dispersing body 110 is a spherical shape. In other embodiments, the at least one heat-dispersing body 110 are cylindrical in shape. In still other embodiments, at least one heat-dispersing body 110 is a 3d lattice structure. In further embodiments, as depicted in FIG. 1C, at least one heat-dispersing body 110 is shaped as a static mixing element.

Figure 3:
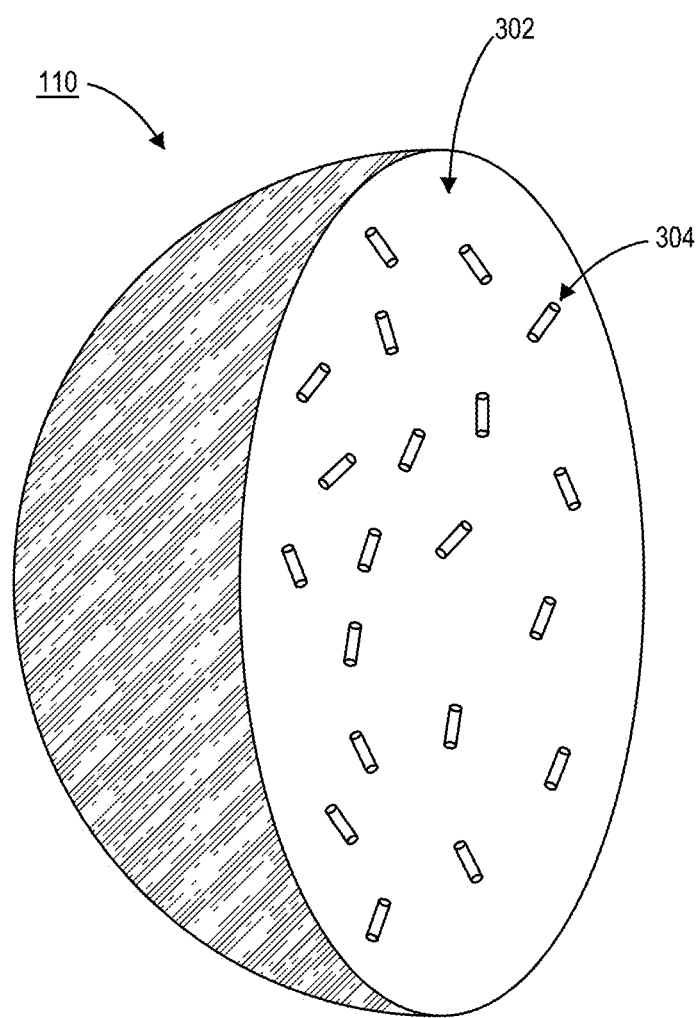
FIG. 3 depicts an exemplary cross-sectional view of a heating component in accordance with embodiments of the invention.

In some embodiments, as discussed with respect to FIG. 3, the at least one heat-dispersing body 110 includes a base material with one or more carbonous materials dispersed throughout. Broadly, the base material may be selected such that it is a suitable carrier material for one or more carbonous materials. In some embodiments, the base material is formed from a material that is stable when exposed to a wide range of temperatures, for example, temperatures between −240 to 260° C. In some embodiments, the base material is formed from a material that is chemically resistant (e.g., does not break down or react while a chemical reaction is occurring).

In some embodiments, as discussed with respect to FIG. 3, the base material of the at least one heat-dispersing body 110 is formed from Polytetrafluoroethylene (PTFE). In other embodiments, the base material of the at least one heat-dispersing body 110 is made from any suitable material known or later developed, including sintered ceramics, Chlorotrifluoroethylene (CTFE), Perfluoroalkoxy (PFA), Ethylene Tetrafluoroethylene (ETFE), and other similar polymers.

In some embodiments, as discussed with respect to FIG. 3, one or more carbonous materials are dispersed throughout base material of the heat-dispersing body 110. The greater the weight percent of carbonous material (e.g., carbon nanotubes, graphite, carbon black, and graphene) in the heat-dispersing body 110, the more reactive the heat-dispersing body 110 may be to an electric field. In some embodiments, one or more carbonous materials are dispersed evenly throughout the base material. In other embodiments, one or more carbonous materials are concentrated in particular areas of the base material. The one or more carbonous materials may have high electrical conductivity and high thermal conductivity. More specifically, one or more carbonous materials may be reactive to electric fields and will heat up and disperse said heat accordingly.

Additionally, depicted in FIG. 1A is an exemplary electrical circuit for RF heating system 100a. In some embodiments, a power source 114 is electrically connected to at least two electrodes 112. In such embodiments, power source 114 may supply a waveform to at least two electrodes 112. Broadly, supplying the at least two electrodes 112 with a waveform may cause an alternating electric field to form between the at least two electrodes 112. More specifically, supplying the at least two electrodes 112 with a waveform may cause a positive charge to build up on one electrode and a negative charge to build up on the other electrode (creating an electric field), wherein the positive and negative charges alternate between the electrodes (creating an alternating electric field).

In some embodiments, the at least one heat-dispersing body 110 and the at least one substance 108 are disposed between the at least two electrodes 112. Broadly, the at least one heat-dispersing body 110 may be a dielectric between the at least two electrodes 112 and thus may be heated by the alternating electric field between the electrodes. More specifically, as the RF alternating electric field is established between the electrodes, the one or more heat-dispersing bodies disposed between the electrodes may continuously orient to the direction of the electric field as the electric field continuously alternates. Therefore, by exposing at least one heat-dispersing body 110 to the alternating electric field generated between the at least two electrodes 112, at least one heat-dispersing body 110 may be heated up.

In some embodiments, at least one heat-dispersing body 110 transfers heat to the at least one surrounding substance 108. Broadly, as at least one heat-dispersing body 110 is heated by the alternating electric field generated between the at least two electrodes 112, the at least one heat-dispersing body 110 may transfer heat to at least one surrounding substance 108. In some embodiments, at least one substance 108 is uniformly heated by at least one heat-dispersing body 110, resulting in the one or more substances in all areas of the container 102 being at a consistent temperature. In some embodiments, the temperature to which the at least one substance 108 is heated by the at least one heat-dispersing body 110 is between 60° C. and 150° C. In other embodiments, the temperature to which the at least one substance 108 is heated by the at least one heat-dispersing body 110 is less than 60° C. In still other embodiments, the temperature to which the at least one substance 108 is heated by the at least one heat-dispersing body 110 is greater than 150° C.

Turning now to FIG. 1B, a second example of an RF heating system 100*b* is depicted. Where components are identical to those discussed above with respect to RF heating system 100*a*, identical reference numerals are used. Broadly, RF heating system 100*b* may heat one or more substances in a particular portion of a container from within the said container. RF heating system 100*b* may use a heating assembly comprising at least two electrodes, at least one heat-dispersing body, and a power source to heat up one or more substances. When at least one heat-dispersing body 110 is mixed in with a portion of one or more substances and exposed to an RF field, the at least one heat-dispersing body 110 may heat up one or more substances.

In some embodiments, as discussed above with respect to RF heating system 100*a*, RF heating system 100*b* includes a container 102. In some embodiments, as discussed above with respect to RF heating system 100*a*, at least two electrodes 112 are attached to the top and bottom of the inside of container 102. In some embodiments, at least two electrodes 112 are attached to the top and bottom of the inside of container 102 by any suitable means. In some embodiments, at least two electrodes 112 are formed from a conductive metallic material, such as copper, silver, aluminum, gold, or any combination thereof. In other embodiments, at least two electrodes 112 are formed from a nonmetallic material, such as graphite.

Broadly, as discussed above with respect to RF heating system 100*a*, the distance between the at least two electrodes 112 may be selected to achieve a desired field strength, and, in turn, a desired temperature for heating the at least one substance 108 may be achieved. In some embodiments, at least one substance 108 is dispersed throughout container 102 and may be any suitable substance for RF heating system 100*b*. In some embodiments, as discussed above with respect to RF heating system 100*a*, at least one substance 108 is pumped into container 102 through intake valve 104 and pumped out of container 102 through outtake valve 106. In some embodiments, at least one heat-dispersing body 110 and at least one substance 108 are pumped into container 102 through intake valve 104 and pumped out of container 102 through outtake valve 106. In such embodiments, at least one heat-dispersing body 110 is circulating throughout heating system 100*b*.

Broadly, RF heating system 100*b* may be used to heat a collection of substances in which only a portion of the collection of substances needs to be heated. In some embodiments, the at least one heat-dispersing body 110 are dispersed in particular portions of the at least one substance 108. For example, at least one heat-dispersing body 110 may only be dispersed in the one or more substances at the bottom of container 102. In some embodiments, at least one heat-dispersing body 110 is dispersed in particular portions of the at least one substance 108 in order to stimulate a plurality of chemical reactions throughout the container.

In some embodiments, as discussed above with respect to RF heating system 100*a*, the at least one heat-dispersing body 110 may be made up of the heat-dispersing body 110 depicted below in FIG. 3. In other embodiments, the at least one heat-dispersing body 110 may be made up of a variation of or entirely different component than heat-dispersing body 110. In some embodiments, as discussed above with respect to RF heating system 100*a*, at least one heat-dispersing body 110 may be manufactured using method 400 (discussed below). In other embodiments, however, the at least one heat-dispersing body 110 may be manufactured using a variation or entirely different process than that discussed above with respect to method 400. Broadly, the considerations made with regard to the base material and the carbonous materials of the at least one heat-dispersing body 110 are essentially the same as those made with regard to RF heating system 100*a*.

Additionally, depicted in FIG. 1B is an exemplary electric circuit for RF heating system 100*b*. In some embodiments, as discussed above with respect to RF heating system 100*a*, a power source 114 is electrically connected to the at least two electrodes 112. In such embodiments, power source 114 may supply a waveform to the at least two electrodes 112. Broadly, supplying the at least two electrodes 112 with a waveform may cause an alternating electric field to form between the at least two electrodes 112.

In some embodiments, as discussed above with respect to RF heating system 100*a*, the at least one heat-dispersing body 110 and the at least one substance 108 are disposed between the at least two electrodes 112, where the at least one heat-dispersing body 110 may behave as a dielectric. Therefore, by exposing the at least one heat-dispersing body 110 to the alternating electric field generated between the at least two electrodes 112, the at least one heat-dispersing body 110 may be heated up.

In some embodiments, the at least one heat-dispersing body 110 transfers heat to a portion of the at least one surrounding substance 108. Broadly, as at least one heat-dispersing body 110 is heated by the alternating electric field generated between the at least two electrodes 112, the at least one heat-dispersing body 110 may transfer heat to the at least one surrounding substance 108. In some embodiments, the at least one heat-dispersing body 110 is only concentrated in a portion of the one or more substances in a particular region of container 102, such as the top or bottom of container 102. Therefore, when at least one heat-dispersing body 110 is stimulated by the alternating electric field, only the one or more substances in the area near the at least one heat-dispersing body 110 may heat. This proves advantageous, as the user of RF heating system 100b may selectively choose which of the at least one substance 108 are to be heated and which are not.

Turning now to FIG. 1C, a third example of an RF heating system 100c is depicted. Where components are identical to those discussed above with respect to RF heating system 100a, identical reference numerals are used. Broadly, RF heating system 100c may heat one or more substances in a container from within the said container. RF heating system 100c may use a heating device made up of electrodes, heat-dispersing bodies, and a power source in order to heat up one or more substances. When at least one heat-dispersing body 110 is dispersed in at least one substance 108 and exposed to an alternating electric field, the at least one heat-dispersing body 110 may heat up the at least one substance 108.

In some embodiments, as discussed above with respect to RF heating system 100a, RF heating system 100c includes a container 102. In some embodiments, as discussed above with respect to RF heating system 100a, at least two electrodes 112 are attached to the top and bottom of the inside of container 102. Broadly, as discussed above with respect to RF heating system 100a, the distances between the at least two electrodes 112 may be selected to achieve a desired field strength, and, in turn, a desired temperature for heating the at least one substance 108 may be achieved.

In some embodiments, as discussed above with respect to RF heating system 100a, at least one substance 108 is dispersed throughout container 102. In some embodiments, as discussed above with respect to RF heating system 100a, at least one substance 108 is pumped into container 102 through intake valve 104 and pumped out of container 102 through outtake valve 106. In some embodiments, at least one heat-dispersing body 110 and at least one substance 108 are pumped into container 102 through intake valve 104 and pumped out of container 102 through outtake valve 106. In such embodiments, at least one heat-dispersing body 110 is circulating throughout heating system 100c.

Broadly, in a substantially similar fashion to RF heating system 100a, RF heating system 100c may be used to heat a collection of substances. In some embodiments, as discussed above with respect to RF heating system 100a, at least one heat-dispersing body 110 may be made up of the heat-dispersing body 110 depicted below in FIG. 3. In other embodiments, at least one heat-dispersing body 110 may be made up of a variation of or entirely different component than heat-dispersing body 110. In some embodiments, as discussed above with respect to RF heating system 100a, at least one heat-dispersing body 110 may be manufactured using method 400 (discussed below). In other embodiments, however, at least one heat-dispersing body 110 may be manufactured using a variation or entirely different process than that discussed below with respect to method 400.

Broadly, at least one heat-dispersing body 110 of RF heating system 100c may behave as a mixer. While heating up the one or more substances, at least one heat-dispersing body 110 may also mix and/or stir one or more substances. For example, at least one heat-dispersing body 110 may mix one or more substances to stimulate a chemical reaction between the one or more substances. In some embodiments, at least one heat-dispersing body 110 forms a static mixing element that is statically mounted within container 102 and configured to provide both heating and mixing to at least one substance 108.

Additionally, depicted in FIG. 1C is an exemplary electrical circuit for RF heating system 100c that is substantially similar to that of RF heating system 100a (discussed above). In some embodiments, power source 114 may supply a waveform to the at least two electrodes 112, causing an alternating electric field to form between the at least two electrodes 112.

In some embodiments, as discussed above with respect to RF heating system 100a, the at least one heat-dispersing body 110 and the at least one substance 108 are disposed between the at least two electrodes 112, where the at least one heat-dispersing body 110 behaves as a dielectric. In some embodiments, as discussed above with respect to FIG. 1A, the at least one heat-dispersing body 110 transfers heat to at least one surrounding substance 108. In some embodiments, the at least one heat-dispersing body 110 also stirs and/or mixes at least one substance 108 while transferring heat to at least one substance 108. This proves advantageous, as at least one heat-dispersing body 110 may serve a dual purpose of heating and mixing.

Figure 2:
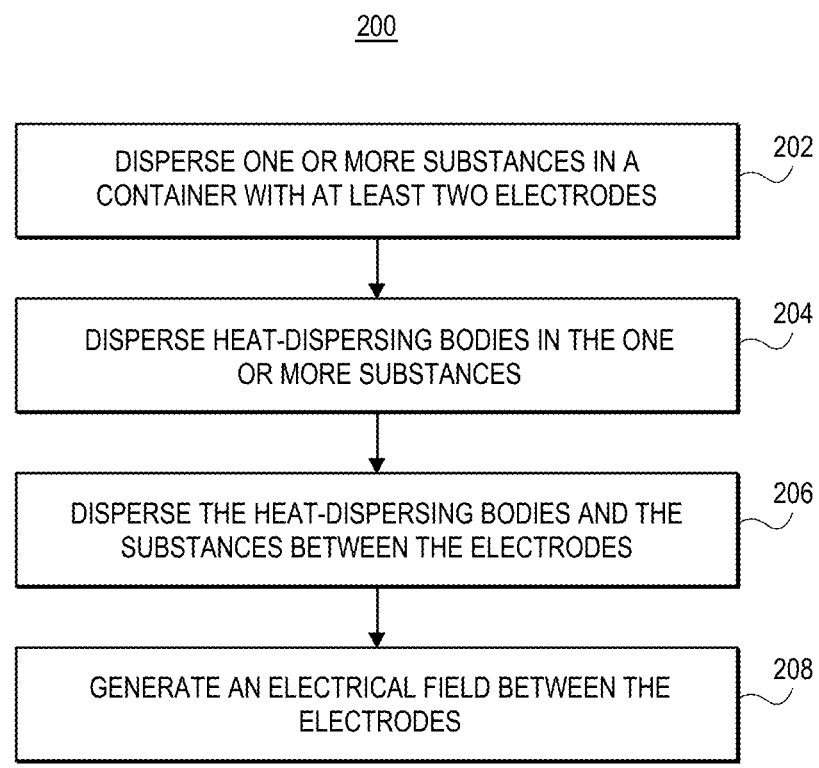
FIG. 2 depicts an example of a method for heating substances through RF heating in accordance with embodiments of the invention.

Turning now to FIG. 2, one example of RF heating one or more substances is depicted and generally referred to as method 200. In some embodiments, method 200 may be carried out at least in part by any suitable RF heating system known or later developed, including RF heating system 100a, RF heating system 100b, and RF heating system 100c disclosed above.

At step 202, one or more substances are dispersed in a container with at least two electrodes. Broadly, as discussed above with respect to RF heating system 100a, the container may be any suitable container known or later developed, including a tube, pipe, tank, reactor, and similar containers. In some embodiments, the container is formed from any suitable material, including plastic, metal, glass, and similar materials.

In some embodiments, as discussed above with respect to RF heating system 100a, one or more substances are dispersed throughout the container. Broadly, one or more substances may be any substance known or later developed. In some embodiments, the one or more substances are one or more materials to be mixed/combined. In other embodiments, one or more substances are materials to be chemically reacted. In some embodiments, one or more substances may include a catalyst. Broadly, the catalyst may serve the purpose of stimulating a reaction as well as increasing the rate at which a reaction occurs. In such embodiments, the material forming the catalyst may be any suitable material known or later developed, including palladium on carbon, acidic resin catalysts, iron oxides on alumina, and similar catalysts.

In some embodiments, as discussed above with respect to RF heating system 100a, one or more substances are pumped into the container through an intake valve and pumped out of the container through an outtake valve. In some embodiments, one or more substances are pumped out of the container when the one or more substances reach a predetermined temperature. In other embodiments, one or more substances are pumped out of the container when a particular chemical reaction has occurred. In still other embodiments, the one or more substances are pumped out of the container when the one or more substances have been sufficiently mixed.

At step 204, one or more heat-dispersing bodies are dispersed between one or more substances. In some embodiments, as discussed with respect to RF heating system 100*a*, the one or more heat-dispersing bodies are evenly dispersed throughout the one or more substances. In other embodiments, as discussed with respect to RF heating system 100*b*, the one or more heat-dispersing bodies are only dispersed in a portion of the one or more substances.

In some embodiments, one or more heat-dispersing bodies may be made up of the heat-dispersing bodies depicted below in FIG. 3. In other embodiments, the one or more heat-dispersing bodies may be made up of a variation of or entirely different component than heat-dispersing body 110. In some embodiments, as discussed above with respect to heat-dispersing body 110, the one or more heat-dispersing bodies may be manufactured using method 400 (discussed below). In other embodiments, however, the one or more heat-dispersing bodies may be manufactured using a variation or entirely different process than that discussed below with respect to method 400.

The one or more heat-dispersing bodies may be any suitable shape now known or later developed including, but not limited to, arcuate, rectangular, and ellipsoidal. For example, as discussed above with respect to at least one heat-dispersing body 110, the one or more heat-dispersing bodies may be a spherical shape, a cylindrical shape, a 3d lattice structure, and a static mixing element shape.

At step 206, one or more heat-dispersing bodies mixed with one or more substances are dispersed between a plurality of electrodes. In some embodiments, as discussed with respect to RF heating system 100*a*, at least two electrodes 112 are attached to the inside of the container 102. Broadly, at least two electrodes 112 may be electrical conductors and may be formed from any suitable nonmetallic or metallic materials.

The distance between the plurality of electrodes may correlate to the strength of the electric field that is able to be generated between the plurality of electrodes. For example, as the distance between the plurality of electrodes increases, the obtainable field strength between the plurality of electrodes may decrease. Therefore, the distances between the plurality of electrodes may be selected to achieve a desired field strength, and, in turn, a desired temperature for heating the one or more substances may be achieved.

At step 208, an electric field is generated between the plurality of electrodes by electrically connecting the plurality of electrodes to a power source. The one or more heat-dispersing bodies may be a dielectric between the plurality of electrodes and are thus heated by the alternating electric field between the electrodes. More specifically, as the RF alternating electric field is established between the plurality of electrodes, the one or more heat-dispersing bodies disposed between the electrodes continuously may orient to the direction of the electric field as the electric field continuously alternates. Therefore, by exposing the one or more heat-dispersing bodies to the alternating electric field generated between the plurality of electrodes, the one or more heat-dispersing bodies may be heated up.

In some embodiments, as discussed with regard to RF heating system 100*a*, a power source is electrically connected to the plurality of electrodes and supplies a waveform to the plurality of electrodes. Broadly, supplying the plurality of electrodes with a waveform may cause an alternating electric field to form between the plurality of electrodes.

In some embodiments, the one or more heat-dispersing bodies transfer heat to the surrounding one or more substances. Broadly, as one or more heat-dispersing bodies are heated by the alternating electric field generated between the plurality of electrodes, the one or more heat-dispersing bodies may transfer heat to the surrounding one or more substances.

Turning to FIG. 3, heat-dispersing body 110 may comprise a base material 302 with one or more carbonous materials 304 dispersed throughout the base material 302. Heat-dispersing body 110 may be used for any suitable application known in the art. In some embodiments, such heat-dispersing bodies may be used for RF heating. For example, heat-dispersing bodies may be used for RF heating in continuous-flow chemistry systems and batch chemistry systems. For another example, heat-dispersing bodies may be used for RF heating in microreactor systems.

In some embodiments, heat-dispersing body 110 is manufactured using method 400 (discussed below). In other embodiments, however, heat-dispersing body 110 is manufactured using a variation or entirely different process than that discussed below with respect to method 400. For example, heat-dispersing bodies may be manufactured using PTFE powder molding.

In some embodiments, heat-dispersing body 110 is a spherical shape, such as depicted in FIG. 1. In other embodiments, heat-dispersing body 110 is a cylindrical shape. In still other embodiments, heat-dispersing body 110 is in the shape of a 3-D lattice structure. In further embodiments, as depicted in FIG. 1C, heat-dispersing body 110 is shaped as a static mixing element. It should be understood that a variety of suitable shapes for the heat-dispersing body 110 not explicitly described herein are also contemplated.

Base material 302 may be selected such that it is a suitable carrier material for the one or more carbonous materials 304. For example, a material with temperature stability may be selected such that the base material does not degrade during further heating cycles of heat-dispersing body 110. For another example, a material with chemical resistance may be selected to prevent interference with chemical reactions. In some embodiments, the base material 302 is formed from a material that is stable when exposed to a wide range of temperatures, for example, temperatures between −240 to 260° C. In some embodiments, base material 302 is formed from a material that is chemically resistant. In some embodiments, base material 302 is formed from Polytetrafluoroethylene (PTFE). In other embodiments, base material 302 is made from any suitable material known or later developed, including sintered ceramics, Chlorotrifluoroethylene (CTFE), Perfluoroalkoxy (PFA), Ethylene Tetrafluoroethylene (ETFE), and other similar polymers.

In some embodiments, as mentioned above, one or more carbonous materials 304 are dispersed throughout base material 302. The greater the weight percent of one or more carbonous materials 304 (e.g., one or more carbon nanotubes) in heat-dispersing body 110, the greater the probability that heat-dispersing body 110 will react to electric fields may be. In some embodiments, one or more carbonous materials 304 are approximately uniformly dispersed throughout base material 302 (e.g., the density of carbonous materials is approximately the same throughout the base material). In some embodiments, a variety of dispersion methods are contemplated to evenly distribute the carbonous materials 304 into the base material 302. For example, in some such embodiments, any of an ultrasonic dispersion technique, high shear mixing, ball mill treatment, or another suitable dispersion technique may be used to disperse the carbonous materials 304. In other embodiments, one or more carbonous materials 304 are concentrated or clustered in particular areas of base material 302. For example, embodiments are contemplated in which the carbonous materials 304 may be substantially concentrated or clustered near a surface of the heat-dispersing body 110 such that an outer surface of the heat-dispersing body 110 generates more heat than the center.

The one or more carbonous materials 304 may be electrically conductive and/or thermally conductive. For example, as discussed below with respect to method 400, the one or more carbonous materials 304 in heat-dispersing body 110 may heat up when exposed to an electric field. It is contemplated that a pre-selected material may form one or more carbonous materials 304 dependent on the characteristics of the system in which heat-dispersing body 110 is to be used in. For example, graphene may be selected for heat-dispersing body 110 to reach a desired temperature.

In some embodiments, one or more carbonous materials 304 are formed from any suitable material (e.g., a thermal enhancement substance) known or later developed, including graphite, graphene, carbon black, carbon nanotubes, and the like. It is contemplated that one or more alternate thermal enhancement substances, such as graphite sheets, may be used in heat-dispersing body 110. In some embodiments, one or more carbonous materials 304 are manufactured using any suitable method known or later developed, including arc discharge, laser ablation of graphite, chemical vapor deposition (CVD), and any similar carbon nanotube manufacturing methods.

Figure 4:
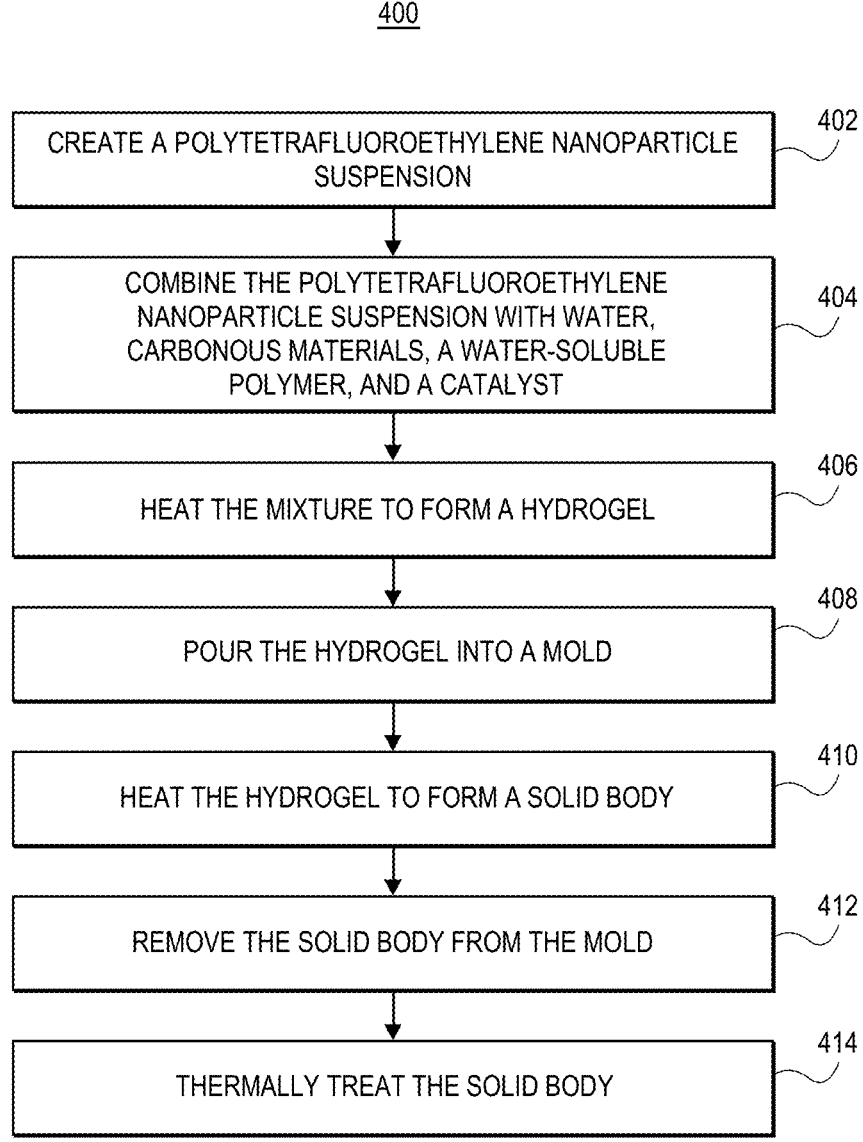
FIG. 4 depicts an example of a method for manufacturing heat-dispersing bodies in accordance with embodiments of the invention.

Turning now to FIG. 4, one example of a method for manufacturing heat-dispersing bodies is depicted and generally referred to as method 400.

At step 402, a polytetrafluoroethylene (PTFE) nanoparticle suspension is created. Generally, the suspension may be created by mixing a solute (e.g., PTFE) in a solvent. In some embodiments, the solvent may be any suitable solvent for suspending PTFE nanoparticles, including water, glycerol, and similar aqueous solutions. PTFE is a chemically resistant and inert material and will not chemically react. PTFE is thermally stable and will maintain its physical structure and properties when exposed to temperature extremes. In some embodiments, the PTFE nanoparticles are substituted with an alternative polymer, such as Chlorotrifluoroethylene (CTFE), Perfluoroalkoxy (PFA), Ethylene Tetrafluoroethylene (ETFE), and other similar polymers.

The weight percentage of the PTFE may be selected to achieve a particular end result, such as a particular shape, structure, and density. In some embodiments, the weight percentage of the PTFE in the nanoparticle suspension is approximately 30%. In other embodiments, the weight percentage of the PTFE in the nanoparticle suspension is between 23% and 33%. In still other embodiments, the weight percentage of the PTFE in the nanoparticle suspension is between 25% and 35%.

At step 404, the nanoparticle suspension is combined with water, carbonous materials, a water-soluble polymer, and a catalyst to form a mixture. The carbonous materials are dispersed throughout the nanoparticle suspension and may be any shape now known or later developed. In some embodiments, the carbonous materials are straight. In other embodiments, the carbonous materials are curved. In some embodiments, the carbonous materials in the mixture are armchair carbonous materials. In other embodiments, the carbonous materials in the mixture are zigzag carbonous materials. In still other embodiments, the carbonous materials are chiral carbonous materials.

In some embodiments, the carbonous materials in the mixture are single-walled carbon nanotubes. In other embodiments, the carbonous materials in the mixture are multi-walled carbon nanotubes. In some embodiments, the outer diameter of the carbonous materials is approximately between 3 nm and 30 nm. In other embodiments, the outer diameter of the carbonous materials is less than 3 nm. In still other embodiments, the outer diameter of the carbonous materials is greater than 30 nm.

In some embodiments, the weight percentage of carbonous materials in the mixture is approximately 4%. In other embodiments, the weight percentage of carbonous materials in the mixture is between 2% and 6%. In still other embodiments, the weight percentage of carbonous materials in the mixture is less than 2%. In further embodiments, the weight percentage of carbonous materials in the mixture is greater than 6%.

In some embodiments, as discussed above with respect to heat-dispersing body 110, the carbonous materials are formed from any suitable material known or later developed, including graphite. In some embodiments, the carbonous materials are manufactured using any suitable method known or later developed, including arc discharge, laser ablation of graphite, chemical vapor deposition (CVD), and any similar carbon nanotube manufacturing methods.

In some embodiments, the mixture may include a water-soluble polymer. The water-soluble polymer may serve the purpose of altering the consistency of the aqueous mixture. In some embodiments, the water-soluble polymer may thicken and gelatinize the mixture, helping to create a hydrogel when heated. In some embodiments, the water-soluble polymer is a curable polymer, such as an acrylate functionalized polymer. In some embodiments, the water-soluble polymer is an acrylate polymer. For example, the water-soluble polymer may be Polyethylene Glycol Diacrylate (i.e., PEGDA). Generally, the water-soluble polymer may be selected to achieve a particular thickness of mixture or strength in the final product.

In some embodiments, the percentage by weight of the water-soluble polymer is between 10% and 15%. In other embodiments, the percentage by weight of the water-soluble polymer is between 8% and 17%. In still other embodiments, the percentage by weight of the water-soluble polymer is between 5% and 20%.

In some embodiments, a catalyst is combined in the mixture. Broadly, the catalyst may serve the purpose of stimulating a reaction as well as increasing the rate at which the reaction occurs. In some embodiments, the material forming the catalyst may be any suitable material known or later developed, including Azobisisobutyronitrile (AIBN), sodium, potassium, ammonium persulfate, and similar catalysts. In some embodiments, the catalyst in the mixture may be an ultraviolet (UV) catalyst, such as 5-Benzoyl-4-hydroxy-2-methoxy benzenesulfonic acid.

At step 406, the mixture is heated to form a hydrogel. In some embodiments, step 406 is an optional step and need not be performed in method 400. In other embodiments, step 406 is omitted entirely from method 400. In some embodiments, the hydrogel is of a pre-selected thickness and consistency to be pourable. As discussed above with respect to step 404, properties of the various materials selected for the mixture, such as the water-soluble polymer, may affect the thickness and consistency of the hydrogel. Broadly, the cross-linked polymer may mitigate tearing and/or breakage of the final product (e.g., carbon nanotubes-filled PTFE). In some embodiments, heating the water-soluble polymer creates a cross-linked polymer. In other embodiments, the water-soluble polymer is a cross-linked polymer when added to the mixture.

At step 408, the hydrogel is poured into a mold. The mold may be any desired shape to obtain a final product in that desired shape. In some embodiments, the mold may be a spherical bead shape, such as depicted with heat-dispersing body 110. In other embodiments, the mold may be the shape of a static mixing element, as depicted in FIG. 1C by heat-dispersing body 110. Broadly, the hydrogel may be pourable, and the mold in which it is to be poured may be any desired shape to obtain a final product for a particular application.

At step 410, the hydrogel is heated to form a solid part. The time and temperature at which the hydrogel is heated may be selected to achieve a particular set of properties in the final product. For example, the temperature and time at which the hydrogel is heated may be selected such that the final product is selectively rigid based on desired characteristics.

In some embodiments, the hydrogel is heated until a predetermined amount of time has passed. In other embodiments, the hydrogel is heated until the mixture is sufficiently treated (e.g., cured, sintered, or annealed). In some embodiments, the hydrogel is heated to approximately 70° C. In other embodiments, the hydrogel is heated to approximately 100° C. In still other embodiments, the hydrogel is heated to a temperature between 70° C. and 100° C.

At step 412, the solid body is removed from the mold. In some embodiments, as discussed above with respect to step 410, the shape of the mold may affect the shape of the final product, as the solid body may maintain the shape of the mold. In some embodiments, the solid body, upon removal, may be a simple shape, such as a spherical bead, cylinder, or flat sheet. In other embodiments, the solid body, upon removal, may be a complex shape, such as that of a static mixing element, a helix, and a 3-D lattice structure.

At step 414, the solid body is thermally treated. Broadly, thermally treating the solid body may remove the remaining water and water-soluble polymer, resulting in a carbonous material-filled PTFE component. In some embodiments, thermally treating the solid body may sinter the solid body, therefore further solidifying the solid body. In some embodiments, thermally treating the solid body may be accomplished by any suitable treatment method known or later developed, including curing, sintering, annealing, and similar treatment methods.

Similarly to the heating of the hydrogel, the time and temperature at which the solid body is heated may be selected to achieve a particular set of properties in the final product. In some embodiments, the solid body is thermally treated at a temperature of approximately 385° C. In other embodiments, the solid body is thermally treated at a temperature between 350° C. and 420° C. In still other embodiments, the solid body is thermally treated at a temperature between 320° C. and 450° C. In some embodiments, the solid body is heated until a predetermined amount of time has passed, such as 1 hour. In other embodiments, the solid body is heated until the mixture is sufficiently treated (e.g., cured, sintered, or annealed).

The solid body may be thermally reactive to RF heating after treatment. For example, the solid body may heat up in response to exposure to an electrical field. In some embodiments, post-processing occurs after the solid body is thermally treated. For example, the solid body may be subject to additional treating, inspection, and similar post-processing tasks. In some embodiments, the solid body may be used in heating systems, such as the heating systems discussed below with regards to FIGS. 1A-1C.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. A system for radio frequency heating comprising:
 a container configured to receive at least one substance;
 a heating assembly configured to heat the at least one substance, the heating assembly comprising:
  a plurality of electrodes;
  a power source connected to the plurality of electrodes, wherein an electrical field between the plurality of electrodes is created by providing power to the plurality of electrodes; and
  one or more heat-dispersing bodies dispersed in the at least one substance, the one or more heat-dispersing bodies comprising:
   a polymer material; and
   a carbonous material dispersed in the polymer material, the carbonous material configured to generate heat within the container responsive to the electrical field between the plurality of electrodes.

2. The system of claim 1, wherein the one or more heat-dispersing bodies are distributed throughout the at least one substance, such that a first concentration of the one or more heat-dispersing bodies in a first portion of the at least one substance is approximately equal to a second concentration of the one or more heat-dispersing bodies in any other non-overlapping portion of the at least one substance.

3. The system of claim 1, wherein the one or more heat-dispersing bodies are dispersed in the at least one substance such that for any pre-established volume in the container, every heat-dispersing body is approximately equal in distance from adjacent heat-dispersing bodies.

4. The system of claim 1 further comprising:
 an intake valve, wherein the intake valve is configured to receive the at least one substance; and
 an outtake valve configured to remove the at least one substance from the system.

5. The system of claim 1 further comprising:
 a catalyst material mixed throughout the at least one substance, the catalyst material configured to stimulate a reaction between the at least one substance.

6. The system of claim 1, wherein the carbonous material comprises a plurality of carbon nanotubes.

7. The system of claim 1, wherein the polymer material comprises Polytetrafluoroethylene.

8. The system of claim 1, wherein the one or more heat-dispersing bodies are circulated throughout the container.

9. A method of manufacturing carbonous material filled polymer, the method comprising:
creating a polytetrafluoroethylene nanoparticle suspension;
combining the polytetrafluoroethylene nanoparticle suspension with water, a plurality of carbonous materials, a water-soluble polymer, and a catalyst to form a mixture;
heating the mixture to form a hydrogel, wherein the hydrogel is pourable;
pouring the hydrogel into a mold;
heating the hydrogel to form a solid body, wherein the solid body is shaped as the mold is shaped;
removing the solid body from the mold; and
thermally treating the solid body such that the water and the water-soluble polymer are removed from the solid body, wherein the treated solid body is the carbonous material filled polymer,
wherein the carbonous material filled polymer is receivable in a radio frequency heating system comprising:
a container configured to receive at least one substance;
a heating assembly configured to heat the at least one substance, the heating assembly comprising:
a plurality of electrodes;
a power source connected to the plurality of electrodes, wherein an electrical field between the plurality of electrodes is created by providing power to the plurality of electrodes; and
the carbonous material filled polymer, the plurality of carbonous materials within the carbonous material filled polymer configured to generate heat within the container responsive to the electrical field between the plurality of electrodes.

10. The method of claim 9, wherein the water-soluble polymer is an acrylate polymer.

11. The method of claim 10, wherein the acrylate polymer is Polyethylene glycol diacrylate.

12. The method of claim 9, wherein a weight percentage of polytetrafluoroethylene in the polytetrafluoroethylene nanoparticle suspension is 30%.

13. The method of claim 9, wherein a weight percentage of the plurality of carbonous materials in the mixture is 4%.

14. The method of claim 9, wherein, responsive to thermally treating the solid body, the carbonous material filled polymer is reactive to RF heating.

15. A method of radio frequency heating at least one substance using a heating assembly, the method comprising:
dispersing the at least one substance in a container of the heating assembly, wherein the at least one substance is disposed between a plurality of electrodes of the heating assembly;
dispersing a plurality of heat-dispersing bodies in the at least one substance between the plurality of electrodes, each heat-dispersing body from the plurality of heat-dispersing bodies comprising:
a polymer material; and
a carbonous material dispersed in the polymer material, the carbonous material configured to generate heat responsive to an alternating electrical field between the plurality of electrodes,
wherein the plurality of heat-dispersing bodies are configured to heat up when exposed to an alternating electric field between the plurality of electrodes,
wherein the plurality of heat-dispersing bodies are configured to disperse heat to the at least one substance; and
generating the alternating electric field between the plurality of electrodes by electrically connecting the plurality of electrodes to a power source.

16. The method of claim 15, wherein the plurality of heat-dispersing bodies in the at least one substance are dispersed such that that plurality of heat-dispersing bodies are dispersed evenly throughout the at least one substance.

17. The method of claim 15, wherein dispersing the plurality of heat-dispersing bodies in the at least one substance is completed such that that plurality of heat-dispersing bodies is concentrated in a portion of the at least one substance.

18. The method of claim 15, further comprising:
mixing the at least one substance using the plurality of heat-dispersing bodies, wherein the plurality of heat-dispersing bodies is a static mixer.

19. The method of claim 15, wherein the at least one substance comprises:
a first substance;
a second substance chemically reactive to the first substance when the first substance and the second substance are heated; and
a catalyst, the catalyst increasing a rate of reaction between the first substance and the second substance when mixed with the first substance and the second substance.

20. The method of claim 15, further comprising:
pumping the at least one substance and the plurality of heat-dispersing bodies into the container; and
pumping the at least one substance and the plurality of heat-dispersing bodies out of the container.

* * * * *